United States Patent
Kwon et al.

(10) Patent No.: US 9,527,254 B2
(45) Date of Patent: Dec. 27, 2016

(54) FILM FOR TIRE INNER LINER AND METHOD FOR MANUFACTURING THE SAME

(71) Applicant: KOLON INDUSTRIES, INC., Gwacheon-si (KR)

(72) Inventors: So-Yeon Kwon, Busan (KR); Hyun Namgoong, Seoul (KR); Young-Han Jeong, Daegu (KR)

(73) Assignee: KOLON INDUSTRIES, INC., Gwacheonsi (KR)

( * ) Notice: Subject to any disclaimer, the term of this patent is extended or adjusted under 35 U.S.C. 154(b) by 376 days.

(21) Appl. No.: 14/346,130

(22) PCT Filed: Sep. 28, 2012

(86) PCT No.: PCT/KR2012/007954
§ 371 (c)(1),
(2) Date: Mar. 20, 2014

(87) PCT Pub. No.: WO2013/048207
PCT Pub. Date: Apr. 4, 2013

(65) Prior Publication Data
US 2014/0227499 A1    Aug. 14, 2014

(30) Foreign Application Priority Data

Sep. 30, 2011 (KR) .................. 10-2011-0100244
Sep. 28, 2012 (KR) .................. 10-2012-0108581

(51) Int. Cl.
*B60C 5/14*    (2006.01)
*B29D 30/06*   (2006.01)
(Continued)

(52) U.S. Cl.
CPC ....... *B29D 30/0681* (2013.01); *B29C 47/0021* (2013.01); *B60C 1/0008* (2013.04);
(Continued)

(58) Field of Classification Search
None
See application file for complete search history.

(56) References Cited

U.S. PATENT DOCUMENTS 5,883,195 A * 3/1999 Couchoud ............... C08L 77/00
                                                    525/167
6,079,465 A * 6/2000 Takeyama ............. B60C 1/0008
                                                    152/510
(Continued)

FOREIGN PATENT DOCUMENTS

CN    101981120    2/2011
CN    102933643    2/2013
(Continued)

OTHER PUBLICATIONS

Woong et al. (KR 20110001651 A). (Jan. 2011), (EPO—machine translation to English).*
(Continued)

*Primary Examiner* — David Sample
*Assistant Examiner* — Donald M Flores, Jr.
(74) *Attorney, Agent, or Firm* — Lex IP Meister, PLLC

(57) ABSTRACT

This disclosure relates to a film for a tire inner liner including a base film layer that has 3 glass transition temperature peaks and an adhesive layer including a resorcinol-formalin-latex(RFL)-based adhesive, and a method for manufacturing the film for a tire inner liner.

19 Claims, 2 Drawing Sheets

(51) Int. Cl.

| | | |
|---|---|---|
| *B29C 47/00* | (2006.01) | |
| *C09J 7/02* | (2006.01) | |
| *C09J 161/12* | (2006.01) | |
| *B60C 1/00* | (2006.01) | |
| *C08J 7/04* | (2006.01) | |
| *C08L 71/02* | (2006.01) | |
| *C08G 69/40* | (2006.01) | |
| *C08L 77/02* | (2006.01) | |
| *C08G 81/00* | (2006.01) | |
| *C09J 107/02* | (2006.01) | |

(52) U.S. Cl.
CPC ............... *B60C 5/14* (2013.01); *C08G 69/40* (2013.01); *C08J 7/047* (2013.01); *C08L 71/02* (2013.01); *C08L 77/02* (2013.01); *C09J 7/02* (2013.01); *C09J 7/0242* (2013.01); *C09J 7/0264* (2013.01); *C09J 161/12* (2013.01); *B29D 2030/0682* (2013.01); *C08G 81/00* (2013.01); *C08G 2261/126* (2013.01); *C08J 2377/00* (2013.01); *C08J 2461/12* (2013.01); *C08L 2205/05* (2013.01); *C09J 107/02* (2013.01); *C09J 2201/622* (2013.01); *C09J 2461/00* (2013.01); *C09J 2471/006* (2013.01); *C09J 2477/006* (2013.01); *Y10T 428/24967* (2015.01); *Y10T 428/2852* (2015.01); *Y10T 428/2874* (2015.01)

(56) References Cited

U.S. PATENT DOCUMENTS

| | | |
|---|---|---|
| 2009/0038727 A1 | 2/2009 | Hong |
| 2010/0234539 A1 | 9/2010 | Malet |
| 2011/0056612 A1 | 3/2011 | Sugimoto |
| 2011/0060082 A1 | 3/2011 | Sugimoto |

FOREIGN PATENT DOCUMENTS

| | | | | |
|---|---|---|---|---|
| JP | 07-101434 | 4/1995 | | |
| JP | 07173282 | 7/1995 | | |
| JP | 09-019987 | 1/1997 | | |
| JP | 09165469 | 6/1997 | | |
| JP | 2001-059057 | 3/2001 | | |
| JP | 2008-503396 | 2/2008 | | |
| JP | 2008-504173 | 2/2008 | | |
| JP | 2009-041019 | 2/2009 | | |
| JP | 2009-255489 | 11/2009 | | |
| JP | 2010-013617 | 1/2010 | | |
| JP | 2010013617 | 1/2010 | | |
| JP | 2010-111817 | 5/2010 | | |
| JP | 2012-523341 | 10/2012 | | |
| JP | 2014-520037 | 8/2014 | | |
| KR | 20090086024 | 8/2009 | | |
| KR | 20110001651 A | * | 1/2011 | ............ B29D 30/08 |
| KR | 1020110110023 | 10/2011 | | |
| WO | WO 2012002108 A1 | * | 1/2012 | ............ B29C 47/92 |

OTHER PUBLICATIONS

Inazawa et al. (WO 2012/002108 A1). (Jan. 2012), (EPO—machine translation to English).*
[NPL-1] "Ultramide®" BASF (2006). <http://www.performance-materials.basf.us/files/pdf/Properties%20of%20the%20Ultramid%20extrusion%20polyamides.pdf>.*
[NPL-2] Ram Charan "NBR rubber its classification and selection criteria". vol. 1, Iss. 10, Mar. 2012. <http://www.ramcharan.org/pdf/NBR.pdf>.*
European Patent Office, extended European Search Report dated Jun. 1, 2015, of the corresponding European Patent Application No. 12836438.7.
"Study on resorcnformaldehyde/rubber adhesive and its Adhesion poperties"SHEN Mingxia et al. China Adhesives, vol. 16. No. 5, May 2007, p. 17-20.

* cited by examiner

FILM FOR TIRE INNER LINER AND METHOD FOR MANUFACTURING THE SAME

TECHNICAL FIELD

The present invention relates to a film for a tire inner liner and a method for manufacturing the same. More particularly, the present invention relates to a film for a tire inner liner that may exhibit an excellent gas barrier property with a thin thickness and thus may enable light weight of a tire and improve mileage of automobiles, and that has excellent formability and mechanical properties, and a method for manufacturing the same.

BACKGROUND OF THE INVENTION

A tire withstands the weight of an automobile, reduces impact from the road, and transfers driving force or braking force of an automobile to the ground.

In general, a tire is a complex of fiber/steel/rubber, and has a structure as shown in FIG. 1.

Tread (1): a part contacting the road. It should afford frictional force required for driving, have good wear resistance, withstand external impact, and have low heat production.

Body ply, or carcass (6): a cord layer in the tire. It should support the vehicle weight, withstand impact, and have high fatigue resistance to bending and stretching exercises while running.

Belt (5): located between the body plies, consists of steel wire in most cases, reduces external impact, and maintains a wide tread to afford excellent vehicle running stability.

Side wall (3): a rubber layer between a part below a shoulder (2) and bead (9). It protects the inner body ply (6).

Inner liner (7): located inside the tire instead of a tube, and prevents air leakage to enable a pneumatic tire.

Bead (9): square or hexagonal wire bundle formed of rubber-coated steel wire. It positions and fixes the tire to a rim.

Cap ply (4): a special cord located on a belt of a radial tire for some cars. It minimizes movement of the belt during running.

Apex (8): triangular rubber filler used to minimize dispersion of the bead, reduce external impact to protect the bead, and prevent air inflow during forming.

A tubeless tire where high pressure air of 30 to 40 psi is injected is commonly used without using a tube, and to prevent air leakage during automobile running, an inner liner having a high gas barrier property is positioned as the inner layer of the carcass.

Previously, a tire inner liner including rubber such as butyl rubber, halobutyl rubber, and the like having relatively low air permeability as a main ingredient was used, but to achieve a sufficient gas barrier property of the inner liner, the rubber content or inner liner thickness should be increased.

However, if rubber content and tire thickness are increased, total weight of the tire may be increased and automobile mileage may be degraded.

Further, since the rubber ingredients have relatively low heat resistance, air pockets may be generated between rubber in the inner surface of a carcass layer and the inner liner, or the shape or properties of the inner liner may be changed in a vulcanization process of a tire or in an automobile running process during which repeated deformations occur at a high temperature.

To bond the rubber ingredients to a carcass layer of a tire, a vulcanizer should be used or a vulcanization process should be applied, but sufficient adhesion may not be secured therewith.

Therefore, various methods have been suggested to decrease the thickness and weight of the inner liner to increase mileage and reduce changes in the shape or properties of the inner liner during vulcanization of a tire or running, and the like.

However, previously known methods have limitations in maintaining excellent air permeability and formability of a tire while sufficiently decreasing the thickness and weight of the inner liner.

In addition, the inner liner manufactured by the previously known method exhibited property degradation or generated cracks and the like in a tire manufacturing process during which repeated deformations occur at a high temperature, or in an automobile running process during which repeated deformations occur and high heat is generated.

DETAILED DESCRIPTION OF THE INVENTION

Technical Objectives

It is an object of the invention to provide a film for a tire inner liner that may exhibit an excellent gas barrier property with a thin thickness and thus may enable a light weight tire and improve mileage of automobiles, and that has excellent formability and mechanical properties.

It is another object of the invention to provide a method for manufacturing a film for a tire inner liner.

Technical Solutions

There is provided a film for a tire inner liner, including a base film layer including a polyamide-based resin and a copolymer including polyamide-based segments and polyether-based segments, and an adhesive layer including a resorcinol-formalin-latex (RFL)-based adhesive formed on at least one side of the base film layer, wherein the content of the polyether-based segment is 15 wt % to 50 wt % based on the total weight of the base film layer, and the base film layer has at least 3 glass transition temperature peaks.

There is provided a method for manufacturing a film for a tire inner liner, including melting and extruding a mixture of a polyamide-based resin and a copolymer of polyamide-based segments and polyether-based segments at 230° C. to 300° C. to form a base film layer, and forming an adhesive layer including a resorcinol-formalin-latex (RFL)-based adhesive on at least one side of the base film layer, wherein the content of the polyether-based segment in the copolymer is 15 wt % to 50 wt % based on total weight of the base film layer, and the base film layer has at least 3 glass transition temperature peaks.

Hereinafter, a film for a tire inner liner and a manufacturing method thereof according to specific embodiments of the invention will be explained in detail.

According to one embodiment of the invention, a film for a tire inner liner including a base film layer including a polyamide-based resin and a copolymer including polyamide-based segments and polyether-based segments, and an adhesive layer including a resorcinol-formalin-latex (RFL)-based adhesive formed on at least one side of the base film layer, is provided, wherein the content of the polyether-based segment is 15 wt % to 50 wt % based on total weight of the base film layer, and the base film layer has at least 3 glass transition temperature peaks.

As the result of studies by the inventors, it was confirmed that if a base film layer that is formed using the polyamide-based resin together with the copolymer including a specific content of polyether-based segments is used, an excellent gas barrier property may be achieved with a thin thickness, and thus the weight of a tire may become light and the mileage of automobiles may be improved, and that a film for a tire inner liner that has high heat resistance and simultaneously has excellent formability and mechanical properties such as excellent durability, fatigue resistance, and the like may be provided, and particularly, it was confirmed that if an adhesive layer including resorcinol-formalin-latex (RFL)-based adhesive is formed on the base film layer, it may be firmly adhered to a tire without applying an additional vulcanization process or significantly increasing the thickness of an adhesive layer.

Particularly, as the base film layer includes the polyamide-based resin and the copolymer including polyamide-based segments and polyether-based segments, and the content of the polyether-based segments of the copolymer is 15 wt % to 50 wt % based on total weight of the base film layer, the base film layer has a specific structure or arrangement property, and may have at least 3 glass transition temperature peaks unlike previously known inner liner films of other polymer resins.

The glass transition temperature peak is a point of inflection that appears convex in a "tan delta value to temperature" graph, and it refers to a point corresponding to a glass transition temperature of a polymer resin.

The tan delta value is a ratio of lost elastic modulus to stored elastic modulus, and it is a value relating to glass transition temperature of a polymer resin or rearrangement of the internal structure of a molten resin.

Specifically, if the lost elastic modulus rapidly increases at a specific temperature range, a point of inflection that is convex appears in the "tan delta value to temperature" graph, and the temperature indicated by the point of inflection (or peak) corresponds to the glass transition temperature of a polymer resin.

Particularly, the base film layer may have at least 3 glass transition temperature peaks, and it may have at least one glass transition temperature peak at a temperature equal to or less than −10° C. Specifically, as the content of polyether-based segments of the copolymer is 15 wt % to 50 wt % in the base film layer, a glass transition temperature peak may appear at a low temperature region, for example, at a temperature range equal to or less than −10° C.

Since the base film layer has properties of the copolymer and includes the polyether-based segments in a specific content range, each block of polyamide-based segments and polyether-based segments may be clearly formed, and the properties of the polyether-based segments compared to the polyamide-based segments may be clearly exhibited.

Thus, the base film layer has a point where lost elastic modulus rapidly increases at a temperature range equal to or less than −10° C. or at a temperature range of −60° C. to −20° C., and at least one glass transition temperature peak appears at a low temperature region in addition to a glass transition temperature peak at a high temperature region.

As the base film layer has at least 3 glass transition temperature peaks, it may have viscoelastic body-like properties even in a polymer state without flowability, and it may exhibit a low modulus, high elasticity, and a high elasticity recovery rate.

Thus, a film for a tire inner liner including the base film layer may exhibit an excellent gas barrier property with a thin thickness, it may exhibit excellent formability in a tire manufacturing process, and crystallization of the film itself or generation of cracks and the like in the film may be prevented even in a tire manufacturing process during which significant deformation is made under high temperature conditions, or in an automobile running process during which repeated deformations are continuously applied.

More specifically, the base film layer may have at least 2 glass transition temperature peaks at a temperature equal to or greater than 10° C., and another glass transition temperature peak at −60° C. to −20° C. Further, the base film layer may have one glass transition temperature peak at 10° C. to 50° C., another glass transition temperature peak at 60° C. to 120° C., and still another glass transition temperature peak at −60° C. to −20° C.

Tan delta values of the base film layer manufactured in Example 1 according to temperature are shown in FIG. 2, In FIG. 2, there are 3 points of inflection of tan delta values to temperature, namely 3 points of inflection that appear convex in the graph are confirmed, and thus it can be seen that the base film layer manufactured in Example 1 has 3 glass transition temperature peaks.

Specifically, the base film layer manufactured in Example 1 may have one glass transition temperature peak at 10° C. to 50° C., another glass transition temperature peak at 60° C. to 120° C., and still another glass transition temperature peak at −60° C. to −20° C.

However, FIG. 2 shows the glass transition temperature peak of one example of a base film layer that can be used according to one embodiment of the invention, and the glass transition temperature value of the base film layer is not limited thereto.

It is believed that the above-explained properties of a film for a tire inner liner result from using a base film layer manufactured using a polyamide-based resin having the above-described specific relative viscosity and a copolymer including specific contents of polyether-based segments and polyamide-based segments.

Specifically, the base film layer may have an excellent gas barrier property and a relatively low modulus by using a copolymer including a specific content of polyether-based segments that afford elastomeric properties to a polyamide-based resin.

The polyamide-based resin included in the base film layer exhibits an excellent gas barrier property due to the unique molecular chain property, for example it exhibits about 10 to 20 times higher gas barrier property compared to a commonly used butyl rubber and the like with the same thickness, and it exhibits a low modulus compared to other resins.

Further, since the polyether-based segments included in the copolymer exist while being bonded or dispersed between polyamide-based segments or polyamide-based resins, it may further lower the modulus of the base film layer, and it may inhibit an increase in stiffness of the base film layer and prevent crystallization at a high temperature.

Since the polyamide-based resin generally exhibits an excellent gas barrier property, it allows the base film layer to have low air permeability while having a thin thickness.

In addition, since the polyamide-based resin exhibits a relatively low modulus compared to other resins, even if applied together with a copolymer including a specific content of polyether-based segments, an inner liner film exhibiting a relatively low modulus property may be obtained, thus improving tire formability.

Further, since the polyamide-based resin has sufficient heat resistance and chemical stability, it may prevent deformation or degeneration of the inner liner film when exposed to chemical substance such as additives and the like or high temperature conditions applied during a tire manufacturing process.

Furthermore, the polyamide-based resin may be used together with a copolymer including polyamide-based segments and polyether-based segments, to exhibit relatively high reactivity to an adhesive (for example, a resorcinol-formalin-latex (RFL)-based adhesive). Thereby, the inner liner film may be easily attached to a carcass part, and an interface break due to heat or repeated deformations during a tire manufacturing process or running and the like may be prevented to afford sufficient fatigue resistance to the inner liner film.

The polyamide-based resin that can be used in the inner liner film may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS, or an N-alkoxy alkylate thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, or nylon 612 may be preferable.

The polyamide-based resin may have relative viscosity (96% sulfuric acid solution) of 3.0 to 3.5, preferably 3.2 to 3.4. If the viscosity of the polyamide-based resin is less than 3.0, sufficient elongation may not be secured due to a decrease in toughness, such that damage may be generated during a tire manufacturing process or automobile running, and the properties including the gas barrier property or formability and the like required for a tire inner liner film may not be secured. If the viscosity of the polyamide-based resin is greater than 3.5, the modulus or viscosity of the manufactured inner liner film layer may become unnecessarily high, and the tire inner liner may not have appropriate formability or elasticity.

The relative viscosity of the polyamide-based resin refers to a relative viscosity measured using a 96% sulfuric acid solution at room temperature.

Specifically, a specimen of a polyamide-based resin (for example, a 0.025 g specimen) is dissolved in a 96% sulfuric acid solution at various concentrations to prepared two or more measurement solutions (for example, a polyamide-based resin specimen is dissolved in 96% sulfuric acid to concentrations of 0.25 g/dL, 0.10 g/dL, and 0.05 g/dL to prepare 3 measurement solutions), and then the relative viscosity of the measurement solutions (for example, the ratio of the average passing time of the measurement solutions to the passing time of the 96% sulfuric acid solution through a viscosity tube) may be obtained using a viscosity tube at 25° C.

In the manufacturing process of a base film, the polyamide-based resin may be included in the base film by mixing it with the above-explained copolymer and melting it, or it may be included in the film by mixing a precursor of the polyamide-based resin such as a monomer or oligomer and the like with the above-explained copolymer together with a reaction initiator, a catalyst, and the like, and reacting them.

Meanwhile, as explained above, since the copolymer including polyamide-based segments and polyether-based segments exists while being bonded or dispersed between polyamide-based resins, it may further lower the modulus of the base film layer, inhibit increase in stiffness of the base film layer, and prevent crystallization at a high temperature.

As the copolymer is included in the base film layer, the film for a tire inner liner may achieve high elasticity or elasticity recovery rate, while securing excellent mechanical properties such as durability, heat resistance, fatigue resistance, and the like.

Thus, the film for a tire inner liner may exhibit excellent formability, a tire using the same may not be physically damaged even in an automobile running process during which repeated deformations and high heat are continuously generated, and the properties or performances of the tire may not be lowered.

The content of the polyether-based segments of the copolymer may be 15 wt % to 50 wt %, preferably 20 wt % to 45 wt %, and more preferably 22 wt % to 40 wt %, based on the total weight of the base film layer.

If the content of the polyether-based segments of the copolymer is too low in the base film layer, the modulus of the tire inner liner film may increase to lower tire formability, or property deterioration due to repeated deformations may largely occur, and particularly if the content is less than 15 wt %, the base film layer will have only one glass transition temperature peak.

Further, if the content of the polyether-based segments of the copolymer is increased too much, the gas barrier property of the inner liner film may be lowered, the inner liner may not easily adhere to a carcass layer due to lowered reactivity to an adhesive, and a uniform film may not be easily manufactured due to increased elasticity of the inner liner film.

The polyether-based segments may be bonded with the polyamide-based segments or may be dispersed between the polyamide-based resins, and they may inhibit growth of large crystal in the base film layer or prevent the base film layer from being easily broken in a tire manufacturing process or in an automobile running process.

The polyether-based segments may further lower the modulus of the film for a tire inner liner, and thus allow the inner liner film to elongate or deform according to the shape of a tire even if a low force is applied when forming a tire, thus enabling easy forming of a tire.

The polyether-based segments may inhibit an increase in stiffness of the film at a low temperature and prevent crystallization at a high temperature, prevent damage or tearing of an inner liner film due to repeated deformations, and improve recovery of an inner liner against deformation to inhibit wrinkle generation due to permanent deformation, thereby improving durability of a tire or an inner liner.

The polyamide-based segments may function for preventing a significant increase in the modulus property while affording mechanical properties over a certain level to the copolymer.

In addition, as the polyamide-based segments are applied, the base film layer may have low air permeability while having a thin thickness, and may have sufficient heat resistance and chemical stability.

The copolymer including polyamide-based segments and polyether-based segments may be a copolymer obtained by reacting polyamide-based monomers or oligomers with polyether-based monomers or oligomers, or may be a copolymer obtained by the polymerization reaction or a cross-linking reaction of a polymer including polyether-based segments with a polymer including polyamide-based segments.

The copolymer including polyamide-based segments and polyether-based segments may be a block copolymer wherein the segments are bonded while forming a block, or it may be a random copolymer wherein the segments are irregularly bonded.

The copolymer including polyamide-based segments and polyether-based segments may be a copolymer including a polymerization reaction product of a polymer including polyamide-based segments and a polymer including polyether-based segments, or it may be a cross-linked copolymer including a cross-linked reaction product of a polymer including polyamide-based segments and a polymer including polyether-based segments.

Meanwhile, in the base film layer, the copolymer including polyamide-based segments and polyether-based segments may be uniformly mixed, or it may be bonded at a partial area or over the whole area through polymerization or cross-linking.

In case the copolymer including polyamide-based segments and polyether-based segments includes a polymerization reaction product or a cross-linking reaction product of a polymer including polyamide-based segments and a polymer including polyether-based segments, the copolymer may include a polymer including polyamide-based segments or a polymer including polyether-based segments, which does not participate in the polymerization or cross-linking reaction.

Thus, in the base film, a polymer including polyamide-based segments or a polymer including polyether-based segments may exist while being mixed or bonded with other components, as well as the polymerization reaction product or cross-liking reaction product.

In this case, the sum of the content of the polyether-based segments of the copolymer and the content of a polymer including polyether-based segments should also be within a range of 15 wt % to 50 wt % based on total weight of the base film layer, so that the properties of an inner liner film may be optimized.

The polyamide-based segments of the copolymer may include a repeat unit of the following Chemical Formula 1 or Chemical Formula 2.

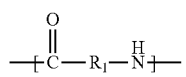

[Chemical Formula 1]

In the Chemical Formula 1, $R_1$ is a C1-20 linear or branched alkylene group or a C7-20 linear or branched arylalkylene group.

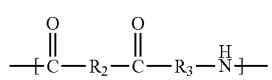

[Chemical Formula 2]

In the Chemical Formula 2, $R_2$ is a C1-20 linear or branched alkylene group, and $R_3$ is a C1-20 linear or branched alkylene group or a C7-20 linear or branched arylalkylene group.

In case a base film layer is manufactured using a copolymer including a polyamide-based repeat unit and a polyether-based repeat unit, the polyamide-based segment may be the polyamide-based repeat unit.

The polyamide-based segment may be derived from a polymer including polyamide-based segments or a polyamide-based monomer or oligomer which is used in the manufacturing process of the base film.

The polyether-based segments of the copolymer may include a repeat unit of the following Chemical Formula 3.

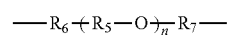

[Chemical Formula 3]

In the Chemical Formula 3, $R_5$ is a C1-10 linear or branched alkylene group, n is an integer of from 1 to 100, and $R_6$ and $R_7$ may be identical or different and are independently a direct bond, —O—, —NH—, —COO—, or —CONH—.

In case a base film layer is manufactured using a copolymer including a polyamide-based repeat unit and a polyether-based repeat unit, the polyether-based segment may be the polyether-based repeat unit.

The polyether-based segment may be derived from a polymer including polyether-based segments, or a polyether-based monomer or oligomer, which is used in the process of manufacturing a base film.

The copolymer including polyamide-based segments and polyether-based segments may have a weight average molecular weight of 50,000 to 300,000, preferably 110,000 to 250,000.

If the weight average molecular weight of the copolymer is less than 50,000, sufficient mechanical properties required for use in an inner liner film may not be secured, and a sufficient gas barrier property may not be achieved due to low air permeability. If the weight average molecular weight of the copolymer is greater than 300,000, the modulus or crystallinity of the inner liner film may excessively increase during high temperature heating, and elasticity or elasticity recovery rate required for an inner liner film may not be secured.

The polyether-based segment unit may have a weight average molecular weight of 500 to 10,000, preferably 1000 to 3000. If the weight average molecular weight of the polyether-based segment is less than 500, it may not properly function for inhibiting growth of large crystals in the film for a tire inner liner or lowering the modulus. If the weight average molecular weight of the polyether-based segment is greater than 10,000, the gas barrier property of the inner liner may be lowered.

In a solution including the polymer material, light scattering occurs because of the polymer chain, and the absolute weight average molecular weight of the polymer material may be measured using the light scattering.

Particularly, using a MALS (multi-angle light scattering) system (Wyatt Company), parameters obtained in the measurement result may be applied to the following Rayleigh-Gans-Debye equation to obtain the absolute weight average molecular weight of the polymer material.

$K^*C/R(\theta)=$
$1/MP(\theta)+2A_2C$  <Equation 1: Rayleigh-Gans-Debye Equation>

In the Equation 1, M is molar mass, and is an absolute weight average molecular weight (Mw) for a polydispersed sample, $R_\theta$ is the excess Rayleigh ratio, $K^*=4\pi^2n_0^2(dn/dc)^2\lambda_0^4N_A^{-1}$, C is polymer concentration (g/ml) in the solution, and $A_2$ is the second virial coefficient.

Further, in the $K^*$, $n_0$ is the refractive index of the solvent, $N_A$ is Avogadro's number, $\lambda_0$ is wavelength of a light source under vacuum, $P(\theta)=R_\theta/R_0$, and $R_0$ is incident light.

Meanwhile, the copolymer may include the polyamide-based segments and the polyether-based segments at a weight ratio of 6:4 to 3:7, preferably 5:5 to 4:6, while the content of the polyether-based segments is 10 wt % to 50 wt % based on total weight of the film.

As explained, if the content of the polyether-based segments is too low, the modulus of the inner liner film may increase to lower formability of a tire, or properties may be largely deteriorated due to repeated deformations.

If the content of the polyether-based segments is too high, the gas barrier property of the inner liner film may be lowered, the inner liner may not easily adhere to a carcass layer due to lowered reactivity to the adhesive, and a uniform film may not be easily manufactured due to increased elasticity of the inner liner film.

In the base film layer, the polyamide-based resin and the copolymer may be included at a weight ratio of 6:4 to 3:7, preferably 5:5 to 4:6. If the content of the polyamide-based resin is too low, the density or gas barrier property of the inner liner film may be lowered. If the content of the polyamide-based resin is too high, the modulus of the inner liner film may become excessively high or formability of a tire may be lowered, the polyamide-based resin may be crystallized under a high temperature environment during a tire manufacturing process or automobile running, and cracks may be generated due to repeated deformations.

Meanwhile, due to the above-explained composition, the base film layer may include 1.3 to 2.5 Equ/E6g, and preferably 1.5 to 2.4 Equ/E6g of amine groups on the surface, and thereby the base film layer may have high reactivity to adhesives known to be used in a polymer resin film, and it may be firmly and uniformly adhered to the inside of a tire or to a carcass layer with a thin and light-weighted adhesive layer.

Particularly, in order to adhere the base film layer to a carcass layer more uniformly and stably, it is preferable to use resorcinol-formalin-latex (RFL)-based adhesive of the above-explained composition.

As such, the film for a tire inner liner may exhibit improved adhesion to an adhesive or an adhesion layer due to the above-explained properties of the base film, and it may be firmly and uniformly adhered to a carcass layer with a thin and light weight adhesion layer without the need to deposit an additional adhesive layer or rubber layer.

The base film layer may have a thickness of 30 μm to 300 μm, preferably 40 μm to 250 μm, more preferably 40 μm to 200 μm. Thereby, the film for a tire inner liner according to one embodiment of the invention may have low air permeability, for example oxygen permeability of 200 cc/(m$^2$·24 h·atm) or less, while having a thin thickness, compared to those previously known.

Meanwhile, the base film layer may be an unstretched film. If the base film layer is an unstretched film, it may have a low modulus and high strain, and thus it may be appropriately applied in a tire forming process during which high expansion is generated. Further, since crystallization hardly occurs in the unstretched film, damage such as cracks and the like may be prevented even if deformations repeatedly occur.

In addition, since the unstretched film does not have large property difference and orientation in a specific direction, an inner liner having uniform properties may be obtained.

As described below in the manufacturing method of a film for a tire inner liner, the base film may be manufactured in the form of an unstretched or non-oriented film by maximally preventing the orientation of the base film layer, for example, by viscosity control through optimization of melt-extrusion temperature, modification of die standard, control of winding speed, and the like.

If an unstretched film is applied for the base film layer, a film for an inner liner may be easily manufactured in a cylindrical or sheet type in a tire manufacturing process. Particularly, in case an unstretched sheet-type film is applied for the base film layer, film manufacturing facilities need not be separately constructed according to tire size, and impact and wrinkles may be minimized during transfer and storage. Further, in case the base film is manufactured in a sheet type, a process of adding an adhesive layer may be more easily conducted, and damage or deformation and the like that may be generated during a manufacturing process due to standard difference from a forming drum may be prevented.

Meanwhile, the base film may layer further include additives such as a heat resistant oxidant, a heat stabilizer, an adhesion improving agent, or a mixture thereof.

Specific examples of the heat resistant oxidant may include N,N'-hexamethylene-bis-(3,5-di-tert-butyl-4-hydroxy-hydrocinnamamide), for example, a commercialized product such as Irganox 1098, tetrakis[methylene(3,5-di-t-butyl-4-hydroxyhydrocinnamate)]methane, for example, a commercialized product such as Irganox 1010, 4,4'-dicumyl-di-phenyl-amine, for example, a commercialized product such as Naugard 445, and the like.

Specific examples of the heat stabilizer may include benzoic acid, triacetonediamine, N,N'-bis(2,2,6,6-tetramethyl-4-piperidyl)-1,3-benzenedicarboxamide, and the like.

However, the additives are not limited thereto, and those known to be usable for a tire inner liner film may be used without specific limitations.

Meanwhile, the adhesive layer including the resorcinol-formalin-latex (RFL)-based adhesive has excellent adhesion and adhesion maintaining performance to the base film layer and a tire carcass layer, and thus it may prevent rupture at an interface between an inner liner film and a carcass layer, which is generated by heat, or repeated deformations in a tire manufacturing process or a running process, to afford sufficient fatigue resistance to the film for an inner liner. It is considered that the main properties of the adhesive layer result from inclusion of a resorcinol-formalin-latex (RFL)-based adhesive of a specific composition.

Previously, as an adhesive for a tire inner liner, a rubber type tie gum and the like was used, and thus an additional vulcanization process was required.

To the contrary, since the adhesive layer includes the resorcinol-formalin-latex (RFL)-based adhesive of a specific composition, it has high reactivity and adhesion to the base film, and it may be compressed under high temperature heating conditions to firmly adhere the base film to a carcass layer without significantly increasing the thickness. Thus, the weight of a tire may become lighter, the mileage of automobiles may be improved, and separation between a carcass layer and an inner liner layer or between the base film and the adhesive layer may be prevented even if deformations occur repeatedly in a tire manufacturing process or in an automobile running process.

Further, since the adhesive layer may exhibit high fatigue resistance to physical/chemical deformations that may be applied in a tire manufacturing process or an automobile running process, it may minimize lowering of adhesion or other properties in a manufacturing process in high temperature conditions or in an automobile running process during which mechanical deformation is applied for a long time.

Furthermore, the resorcinol-formalin-latex (RFL)-based adhesive may exhibit good adhesion performance due to cross-linking between latex and rubber, it is physically a latex polymer and thus has a flexible property like rubber due to low hardness, and a methylol end group of the resorcinol-formalin polymer and a base film may be chemically bonded.

Thus, if the resorcinol-formalin-latex (RFL)-based adhesive is applied to a base film, a film for a tire inner liner having sufficient adhesion performance and high elasticity may be provided.

The resorcinol-formalin-latex (RFL)-based adhesive may include 2 wt % to 32 wt %, preferably 10 wt % to 20 wt % of a condensate of resorcinol and formaldehyde, and 68 wt % to 98 wt %, preferably 80 wt % to 90 wt % of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation.

The condensate of resorcinol and formaldehyde may be included in the content of 2 wt % or more based on total weight of the adhesive layer in terms of a chemical reaction for excellent adhesion, and it may be included in the content of 32 wt % or less to secure adequate fatigue resistance.

The latex may be selected from the group consisting of natural rubber latex, styrene/butadiene rubber latex, acrylonitrile/butadiene rubber latex, chloroprene rubber latex, styrene/butadiene/vinylpyridine rubber latex, and a mixture thereof.

The latex may be included in the content of 68 wt % or more based on total weight of the adhesive layer for flexibility and an effective cross-linking reaction with rubber, and it may be included in the content of 98 wt % or less for a chemical reaction with a base film and stiffness of the adhesive layer.

The adhesive layer may further include at least one additive such as a surface tension control agent, a heat resistance agent, an antifoaming agent, a filler, and the like, in addition to the condensate of resorcinol and formaldehyde.

Although the surface tension control agent is applied for uniform coating of the adhesive layer, it may cause a decrease in adhesion when introduced in an excessive amount, and thus it may be included in the content of 2 wt % or less, or 0.0001 wt % to 2 wt %, preferably 1.0 wt % or less, or 0.0001 wt % to 0.5 wt %, based on total weight of the adhesive.

The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of 0.1 μm to 20 μm, preferably 0.1 μM to 10 μm, more preferably 0.2 μm to 7 μm, still more preferably 0.3 μm to 5 μm, and it may be formed on at least one surface of a film for a tire inner liner.

If the thickness of the adhesive layer is too thin, the adhesive layer itself may become thinner when a tire is inflated, cross-linking adhesion between a carcass layer and a base film may be lowered, and stress may be concentrated on a part of the adhesive layer to lower the fatigue property.

If the thickness of the adhesive layer is too thick, interface separation may occur in the adhesive layer to lower the fatigue property.

To adhere the inner liner film to a carcass layer of a tire, an adhesive layer is generally formed on one side of the base film, but in case a multi-layered inner liner film is applied, or adhesion to rubber on both sides is required according to a tire forming method and construction design, for example when an inner liner film covers a bead part, the adhesive layer may be preferably formed on both sides of the base film.

The film for a tire inner liner may maintain optimum internal pressure even after use for a long period. For example, when 90 day-IPR (internal pressure retention) of a tire using the tire inner liner film is measured under 21° C. and 101.3 kPa conditions according to ASTM F1112-06, internal pressure retention as shown in the following Equation 2 may become 95% or more, that is, an internal pressure decrease may be 5% or less.

Thus, if the film for a tire inner liner is used, degradation of mileage and overturning accidents caused by low internal pressure may be prevented.

$$\text{Internal pressure retention (\%)} = \left\{1 - \frac{\begin{array}{c}\text{Internal pressure of the}\\\text{tire at first evaulation}-\\\text{Internal pressure of the tire}\\\text{after standing for 90 days}\end{array}}{\begin{array}{c}\text{Internal pressure of}\\\text{the tire at first evaluation}\end{array}}\right\} *100 \quad \text{[Equation 2]}$$

Meanwhile, according to another embodiment of the invention, a method for manufacturing a film for a tire inner liner is provided, including melting a mixture of a polyamide-based resin and a copolymer including polyamide-based segments and polyether-based segments at 230° C. to 300° C., and extruding the molten substance to form a base film layer, then forming an adhesive layer including the resorcinol-formalin-latex (RFL)-based adhesive on at least one side of the base film layer, wherein the content of the polyether-based segments of the copolymer is 15 wt % to 50 wt % based on total weight of the base film layer, and the base film layer has two glass transition temperature peaks.

As the result of studies of the inventors, it was confirmed that a film for a tire inner liner that is manufactured by forming an adhesive layer including the resorcinol-formalin-latex (RFL)-based adhesive on at least one surface of a base film layer that is obtained using the polyamide-based resin and a specific content of the above-described copolymer (including polyether-based segments in the content of 15 wt % to 50 wt % based on total weight of the base film layer) may exhibit an excellent gas barrier property with a thin thickness, and thus reduce the weight of a tire and improve mileage of automobiles, so it may have excellent formability and mechanical properties while having high heat resistance, and it may be firmly adhered to a tire without applying an additional vulcanization process or significantly increasing the thickness of an adhesive layer.

Particularly, as the base film layer has properties of the copolymer and includes a specific content of polyether-based segments, it may have two kinds of glass transition temperature peaks.

Specifically, the base film layer may have one glass transition temperature peak at 10° C. to 100° C., and another glass transition temperature peak at −60° C. to −20° C.

As the base film layer has two glass transition temperature peaks, it may have viscoelastic material-like properties even in a polymer state without flowability, and it may exhibit a low modulus, high elasticity, and a high elasticity recovery rate.

Thus, a film for a tire inner liner including the base film layer may exhibit an excellent gas barrier property with a thin thickness, it may exhibit excellent formability in a tire manufacturing process, and crystallization of the film itself or damage such as crack in the film may be prevented even in a tire manufacturing process during which significant deformation is made under a high temperature condition or in an automobile running process during in which repeated deformations are continuously applied.

Meanwhile, the polyamide-based resin may have relative viscosity (96% sulfuric acid solution) of 3.0 to 3.5, preferably 3.2 to 3.4.

The copolymer including polyamide-based segments and polyether-based segments may have a weight average molecular weight of 50,000 to 300,000.

Further, the content of the polyether-based segments of the copolymer may be 15 wt % to 50 wt %, or 20 wt % to 45 wt %, preferably 22 wt % to 40 wt %, based on total weight of the base film layer.

The details of the polyamide-based resin, and the copolymer including polyamide-based segments and polyether-based segments, are as explained above.

The polyamide-based resin may be included in the base film by mixing or compounding it with the above-explained copolymer and then melting it, or it may be included in the base film by mixing a precursor of the polyamide-based resin such as monomers or oligomers and the like with the above-explained copolymer together with a reaction initiator, a catalyst, and the like, and reacting them.

The copolymer including the polyamide-based segments and polyether-based segments may be included in the base film by mixing or compounding the copolymer itself with the polyamide-based resin and then melting it.

The base film layer may be formed by mixing or compounding a polymer including polyamide-based segments and a polymer including polyether-based segments, conducting a polymerization reaction or a cross-linking reaction, and then mixing the product of the polymerization or cross-liking reaction with the polyamide-based resin and melting it.

The polymerization reaction or cross-linking reaction of the two kinds of polymers may be caused by mixing or compounding a polymer including polyamide-based segments and a polymer including polyether-based segments, and mixing the mixture or compounded substance with the polyamide-based resin and melting it, and by this process, the base film layer may be formed.

In the base film layer, the polyamide-based resin and the copolymer including polyamide-based segments and polyether-based segments may be uniformly mixed, or it may be bonded at a partial area or over the whole area through a polymerization reaction or a cross-linking reaction.

In the step of forming the base film layer, to extrude a film having more uniform thickness, the copolymer and the polyamide-based resin may be controlled so as to have a uniform thickness.

As such, by controlling the sizes of the copolymer and the polyamide-based resin, in the step of mixing them, a step of leaving them in a feeder that is maintained at a constant temperature, a step of melting and extruding them, and the like, the copolymer and the polyamide-based resin may be more uniformly mixed, agglomeration of the copolymer and the polyamide-based resin respectively or with each other and the resulting increase in size may be prevented, and thus a base film having a more uniform thickness may be formed.

If the copolymer and the polyamide-based resin have similar sizes, agglomeration of raw material chips or generation of non-uniform shapes or areas may be minimized in the subsequent step of mixing, melting, or extruding, and thus a base film layer having a uniform thickness over the whole area of the film may be formed.

The sizes of the copolymer and the polyamide-based resin that can be used in the manufacturing method are not specifically limited, and for example, the copolymer or polyamide-based resin of a chip shape having a maximum diameter of 2 mm to 3 mm may be used.

Meanwhile, the method for manufacturing a film for a tire inner liner may further include a step of mixing the polyamide-based resin and the copolymer at a weight ratio of 6:4 to 3:7.

If the content of the polyamide-based resin is too low, the density or gas barrier property of the base film layer may be lowered. Further, if the content of the polyamide-based resin is too high, the modulus of the base film layer may become excessively high or formability of a tire may be lowered, the polyamide-based resin may be crystallized in a high temperature environment during a tire manufacturing process or an automobile running process, and cracks may be generated due to repeated deformations.

In the mixing step, any apparatus or method known to be usable for mixing a polymer resin may be used without specific limitations.

The polyamide-based rein and the copolymer may be injected into a feeder after they are mixed, or they may be sequentially or simultaneously injected into a feeder and mixed.

As explained above, the copolymer may include polyamide-based segments and polyether-based segments at a weight ratio of 6:4 to 3:7.

A mixture of the polyamide-based resin and the copolymer may be supplied to an extrusion die through a feeder that is maintained at a temperature of 50° C. to 100° C.

As the feeder is maintained at a temperature of 50° C. to 100° C., the mixture of the polyamide-based resin and the copolymer may have appropriate properties such as viscosity and thus may be easily transferred to an extrusion die or other parts of an extruder, faulty feeding that is generated due to agglomeration of the mixture and the like may be prevented, and a more uniform base film may be formed in the subsequent melting and extrusion process.

The feeder functions to supply injected raw material to an extrusion die or other parts in an extruder, the constitution thereof is not specifically limited, and it may be a common feeder included in an extruder for manufacturing a polymer resin.

Meanwhile, by melting and extruding the mixture that is supplied to an extrusion die through the feeder at 230° C. to 300° C., a base film layer may be formed.

A temperature for melting the mixture may be 230° C. to 300° C., preferably 240° C. to 280° C.

Although the melting temperature should be higher than the melting point of the polyamide-based compounds, if it is too high, carbonization or decomposition may occur to lower properties of a film, bonding between the polyether-based resins may occur, or orientation may be generated in a fiber arrangement direction, and thus too high a melting temperature may be unfavorable for manufacturing an unstretched film.

As the extrusion die, those known to be usable for extruding a polymer resin may be used without specific limitations, but a T-type die may be preferably used so that the thickness of the base film may become more uniform or orientation may not be generated in the base film.

Meanwhile, the step of forming the base film layer may include extruding a mixture of the polyamide-based resin and the copolymer including polyamide-based segments and polyether-based segments to a film with a thickness of 30 μm to 300 μm.

The thickness of the manufactured film may be controlled by controlling extrusion conditions, for example, discharge rate of an extruder or gap of an extrusion die, or changing the winding speed of the extrudate in a cooling process or a recovery process.

To control the thickness of the base film layer uniformly in the range of 30 μm to 300 μm, the die gap of the extrusion die may be controlled to 0.3 mm to 1.5 mm.

In the step of forming the base film, if the die gap is too small, shear pressure and shear stress in the melt-extrusion process may become too high, and thus uniform shape of the extruded film may not be formed and productivity may be lowered. Further, if the die gap is too large, stretching of the melt extruded film may largely occur to generate orientation, and a property difference between the machine direction and the transverse direction of the manufactured base film may become large.

Furthermore, in the manufacturing method of the film for a tire inner liner, the thickness of the manufactured base film may be continuously measured, and the measurement result may be fed back to control the part of the extrusion die where non-uniform thickness appears, for example, a lip gap adjustment bolt of the T-die, thus reducing deviation of the manufactured base film and thereby obtaining a film having a more uniform thickness.

The measurement of the film thickness-feed back-control of extrusion die may constitute an automated process step by using an automated system, for example an Auto Die system and the like.

Meanwhile, the manufacturing method of the film for a tire inner liner may further include a step of solidifying the base film layer formed through melting and extrusion in a cooling part maintained at a temperature of 5° C. to 40° C., preferably 10° C. to 30° C.

By solidifying the base film layer formed through melting and extrusion in a cooling part maintained at a temperature of 5° C. to 40° C., a film with more uniform thickness may be provided.

If the base film layer formed through melting and extrusion is folded or attached to a cooling part maintained at the appropriate temperature, orientation may not substantially occur, and the base film layer may be provided as an unstretched film. Specifically, the solidifying step may include uniformly attaching the base film formed through melting and extrusion to a cooling roll maintained at a temperature of 5° C. to 40° C. using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion or partially non-uniform cooling and the like may be prevented, and thus a film having a more uniform thickness may be formed, and areas having a relatively thick or thin thickness compared to the surrounding parts in the film may not be substantially formed.

Meanwhile, the molten material extruded under the specific die gap conditions may be attached or folded to a cooling roll installed at a horizontal distance of 10 mm to 150 mm, preferably 20 mm to 120 mm from the die outlet, to eliminate stretching and orientation.

The horizontal distance from the die outlet to the cooling roll may be a distance between the die outlet and a point where discharged molten material is folded to the cooling roll.

If the linear distance between the die outlet and the cooling roll attaching point of the molten film is too small, uniform flow of melt extruded resin may be disturbed and the film may be non-uniformly cooled, and if the distance is too large, an effect of inhibiting film stretching may not be achieved.

In the step of forming the base film, except for the above-explained steps and conditions, film extrusion conditions commonly used for manufacturing of a polymer film, for example, screw diameter, screw rotation speed, line speed, and the like may be appropriately selected.

Meanwhile, the manufacturing method of the film for a tire inner liner may include a step of forming an adhesive layer including the resorcinol-formalin-latex (RFL)-based adhesive on at least one side of the base film layer.

The step of forming the adhesive layer may be progressed by coating the resorcinol-formalin-latex (RFL)-based adhesive on one side or both sides of the base film, and then drying it. The formed adhesive layer may have a thickness of 0.1 μm to 20 μm, preferably 0.1 μm to 10 μm.

The resorcinol-formalin-latex (RFL)-based adhesive may include 2 wt % to 32 wt % of a condensate of resorcinol and formaldehyde, and 68 wt % to 98 wt %, preferably 80 wt % to 90 wt %, of latex. Namely, the step of forming the adhesive layer may include coating an adhesive including 2 wt % to 30 wt % of a condensate of resorcinol and formaldehyde, and 69 wt % to 98 wt % of a latex on at least one surface of the base film layer to a thickness of 0.1 μm to 20 μm.

The details of the resorcinol-formalin-latex (RFL)-based adhesive with the above specific composition are as explained above.

A commonly used coating method or apparatus may be used to coat the adhesive without specific limitations, but knife coating, bar coating, gravure coating, spray coating, or immersion coating may be used. However, knife coating, gravure coating, or bar coating may be preferable for uniform coating of the adhesive.

After forming the adhesive layer on one side or both sides of the base film, drying and an adhesive reaction may be simultaneously progressed, but a heat treatment reaction step may be progressed after the drying step considering reactivity of the adhesive, and the step of forming the adhesive layer and drying and reacting may be applied several times for thickness of the adhesive layer or application of a multi-layered adhesive.

After coating the adhesive on the base film, a heat treatment reaction may be conducted by solidifying and reacting at 100° C. to 150° C. for approximately 30 seconds to 3 minutes.

In the step of forming the copolymer or mixture, or in the step of melting and extruding the copolymer, additives such as a heat resistant antioxidant, heat stabilizer, and the like may be additionally added.

The details of the additives are as explained above.

Advantageous Effect of the Invention

According to the present invention, a film for a tire inner liner that may exhibit an excellent gas barrier property with a thin thickness, and thus reduce the weight of a tire and improve mileage of automobiles, and that has excellent formability and mechanical properties while having high heat resistance, and a method for manufacturing a film for a tire inner liner are provided.

DETAILS FOR PRACTICING THE INVENTION

Figure 1:
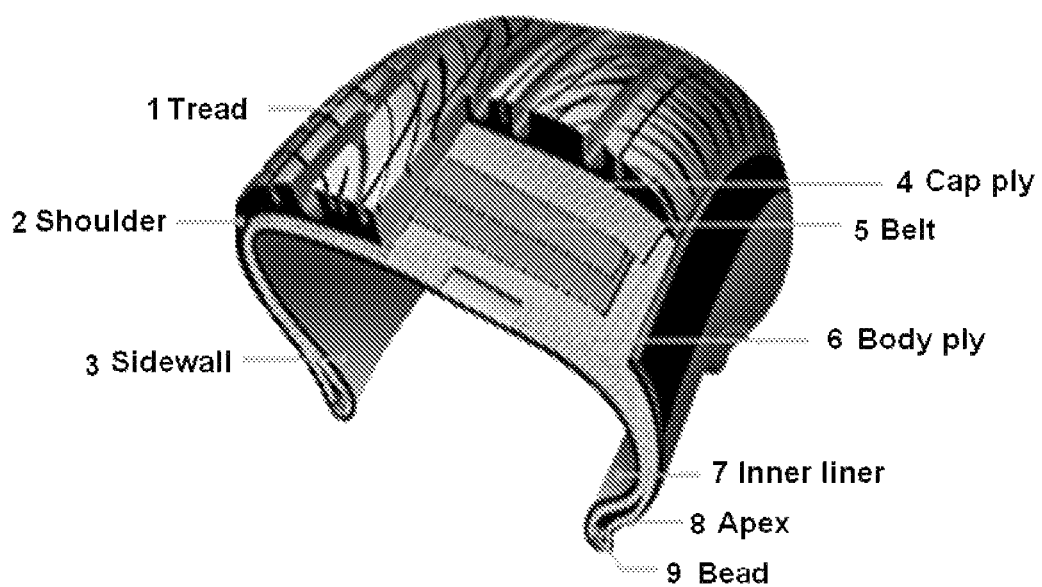
FIG. 1 schematically shows the structure of a tire.

Hereinafter, the present invention will be explained in detail with reference to the following examples. However, these examples are only to illustrate the invention and the scope of the invention is not limited thereto.

EXAMPLE

Manufacture of a Film for a Tire Inner Liner

Example 1

(1) Manufacture of a Base Film
60 wt % of a copolymer resin (relative weight average molecular weight about 150,000) that is synthesized using 50 wt % of amine-terminated polyethylene glycol and 50 wt % of nylon 6 resin, and 40 wt % of nylon 6 resin having relative viscosity of 3.3 (96% sulfuric acid solution), were mixed.

At this time, while controlling the temperature of the feeder to 50° C. to 100° C. so as to prevent fusion of the mixture to an extruder screw and resulting faulty feeding, the mixture was supplied to an extrusion die.

The supplied mixture was extruded through a T type die (die gap—1.0 mm) at 260° C. while maintaining uniform flow of the molten resin, and the molten resin was cooled and solidified in the form of a film having a uniform thickness on the surface of a cooling roll that is controlled to 25° C. using an air knife.

An unstretched base film having a thickness of 100 μm was obtained at a speed of 15 m/min without passing stretching and heat treatment sections.

(2) Coating of Adhesive
Resorcinol and formaldehyde were mixed at a mole ratio of 1:2, and then subjected to a condensation reaction to obtain a condensate of resorcinol and formaldehyde.

12 wt % of the condensate of resorcinol and formaldehyde and 88 wt % of styrene/butadiene-1,3/vinylpyridine latex were mixed to obtain a resorcinol-formalin-latex (RFL)-based adhesive with a concentration of 20%.

The resorcinol-formalin-latex (RFL)-based adhesive was coated on the base film to a thickness of 1 μm using a gravure coater, and dried and reacted at 150° C. for 1 minute to form an adhesive layer.

Example 2

(1) Manufacture of a Base Film
A base film was manufactured by the same method as Example 1, except that 60 wt % of a copolymer resin (relative weight average molecular weight about 150,000) that is synthesized using 40 wt % of amine-terminated polyethylene glycol and 60 wt % of nylon 6 resin, and 40 wt % of nylon 6 resin having relative viscosity of 3.3 (96% sulfuric acid solution), were mixed.

(2) Coating of Adhesive
An adhesive layer was formed on the manufactured base film by the same method as Example 1.

Example 3

(1) Manufacture of a Base Film
A base film was manufactured by the same method as Example 1, except that 50 wt % of a copolymer resin (relative weight average molecular weight about 150,000) that is synthesized using 40 wt % of amine-terminated polyethylene glycol and 60 wt % of nylon 6 resin, and 50 wt % of nylon 6 resin having relative viscosity of 3.3 (96% sulfuric acid solution), were mixed.

(2) Coating of Adhesive
An adhesive layer was formed on the manufactured base film by the same method as Example 1.

COMPARATIVE EXAMPLES

Manufacture of a Film for a Tire Inner Liner

Comparative Example 1

A base film was manufactured by the same method as Example 1, except that 50 wt % of a copolymer resin (relative weight average molecular weight about 150,000) that is synthesized using 20 wt % of amine-terminated polyethylene glycol and 80 wt % of nylon 6 resin, and 50 wt % of nylon 6 resin having relative viscosity of 3.3 (96% sulfuric acid solution), were mixed.

An adhesive layer was formed on the manufactured bas film by the same method as Example 1.

Comparative Example 2

A base film was manufactured by the same method as Example 1, except that 60 wt % of a copolymer resin (relative weight average molecular weight about 150,000) that is synthesized using 20 wt % of amine-terminated polyethylene glycol and 80 wt % of nylon 6 resin, and 20 wt % of nylon 6 resin having relative viscosity of 3.3 (96% sulfuric acid solution), were mixed.

An adhesive layer was formed on the manufactured base film by the same method as Example 1.

EXPERIMENTAL EXAMPLE

Measurement of Properties of a Film for a Tire Inner Liner

Experimental Example 1

Measurement of Glass Transition Temperature

The glass transition temperatures of the base film layers obtained in examples and comparative examples were measured at a temperature of 60° C. to 140° C., by applying experiment conditions of a static strain of 1%, a dynamic strain of 0.1%, and a frequency of 10 Hz in a temperature sweep mode, using DMTS (dynamic mechanical thermal analysis system) Eplexor 500N of GABO Company.

Figure 2:
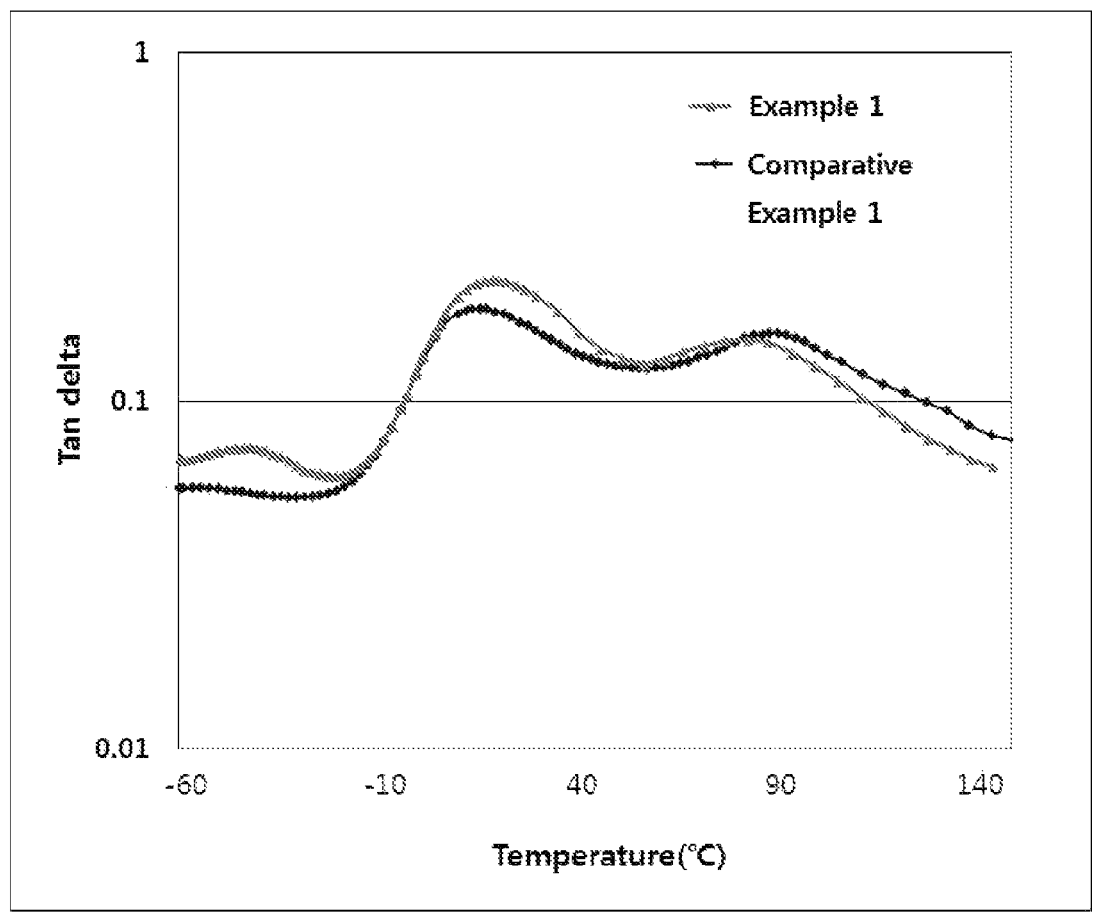
FIG. 2 is a graph showing tan delta values of the base film layer of Example 1 according to temperature.

The measurement results are shown in FIG. 2 and the following Table 1.

Experimental Example 2

Oxygen Permeability Test

Oxygen permeability of the tire inner liner films obtained in the examples and comparative examples was measured. The specific measurement method is as follows.
(1) Oxygen permeability: measured according to ASTM D 3895, using an oxygen permeation analyzer (Model 8000, Illinois Instruments Company) under a 25° C. 60 RH % atmosphere.

Experimental Example 3

Measurement of Internal Pressure Retention

Tires were manufactured using the tire inner liner films of the examples and comparative examples, applying the 205R/65R16 standard.
Further, 90-day IPRs (internal pressure retention) of the tires were measured and compared/evaluated as shown in the following Equation 2, under a 21° C. temperature and 101.3 kPa pressure condition according to ASTM F 1112-06.

$$\text{Internal pressure retention } (\%) = \left\{1 - \frac{\begin{pmatrix}\text{Internal pressure of the}\\ \text{tire at first evaulation} -\\ \text{Internal pressure of the tire}\\ \text{after standing for 90 days}\end{pmatrix}}{\text{Internal pressure of}}\right\} * 100 \quad [\text{Equation 2}]$$

TABLE 1

Results of Experimental Example 1

| | Content of polyether-based segments of copolymer (in the total film) | Glass transition temperature peak at a low temperature region (° C.) |
|---|---|---|
| Example 1 | 30 wt % | −39.9 |
| Example 2 | 24 wt % | −41.9 |
| Example 3 | 20 wt % | −40.9 |
| Comparative Example 1 | 10 wt % | Not detected |
| Comparative Example 2 | 12 wt % | Not detected |

As shown in Table 1, it was confirmed that the base film layers including polyether-based segments of the copolymer in the content of 20 wt % to 30 wt % based on the total film have one glass transition temperature peak at a temperature region of −60° C. to −20° C.

To the contrary, it was confirmed that the base film layers of the comparative examples do not show a glass transition temperature peak at a temperature region of −60° C. to −20° C.

Further, as confirmed in FIG. 2, the base film layer obtained in Example 1 shows one glass transition temperature peak at a temperature region of −60° C. to −20° C., and two glass transition temperature peaks at a temperature region of 10° C. to 100° C.

To the contrary, referring to the tan delta values of the base film layer obtained in Comparative Example 2 as shown in FIG. 2, it was confirmed that it does not show a glass transition temperature peak at a temperature region of −60° C. to −20° C., and it shows two glass transition temperature peaks at a temperature region of 10° C. to 100° C.

TABLE 2

Results of Experimental Examples 2 and 3

| Unit | Oxygen permeability cc/(m² · 24 h · atm) | Internal pressure retention % |
|---|---|---|
| Example 1 | 130 | 97.1 |
| Example 2 | 120 | 96.7 |
| Example 3 | 120 | 97.5 |
| Comparative Example1 | 310 | Not detected |
| Comparative Example 2 | 300 | Not detected |

As shown in Table 2, it was confirmed that the base film layers obtained in the examples exhibit low oxygen permeability compared to the base film layers obtained in the comparative examples, and thus may achieve excellent superior gas barrier property when practically applied for a tire.

Further, the base film layers obtained in the examples do not show a significant change in the properties or shape for a long time, for example, for 90 days, when practically applied to a tire, and thus it was confirmed that they exhibit high internal pressure retention.

To the contrary, the base film layers obtained in the comparative examples were difficult to apply in a practical tire manufacturing process due to low formability, and when internal pressure retention was measured as explained above, they failed to maintain internal pressure of a tire for 90 days and thus related performance could not be evaluated.

Accordingly, it was confirmed that the base film layers obtained in the examples have the characteristic glass transition temperature peak distribution together with the above-explained compositional properties, and may achieve a superior gas barrier property and internal pressure retention.

What is claimed is:
1. A film for a tire inner liner, comprising
a base film layer comprising a polyamide-based resin, a copolymer comprising polyamide-based segments and polyether-based segments, and an adhesive layer comprising a resorcinol-formalin-latex (RFL)-based adhesive formed on at least one side of the base film layer,
wherein the content of the polyether-based segments is 15 wt % to 50 wt % based on total weight of the base film layer, and
the base film layer has at least 3 glass transition temperature peaks,
wherein the copolymer comprising polyamide-based segments and polyether-based segments has a weight average molecular weight of 50,000 to 300,000.
2. The film for a tire inner liner according to claim 1, wherein the base film layer has at least one glass transition temperature peak at a temperature equal to or less than −10 ° C.
3. The film for a tire inner liner according to claim 1, wherein the base film layer has two glass transition temperature peaks at a temperature equal to or greater than 10° C., and has another glass transition temperature peak at a temperature of −60° C. to −20° C.

4. The film for a tire inner liner according to claim 1, wherein the polyamide-based resin has relative viscosity of 3.0 to 3.5 (96% sulfuric acid solution).

5. The film for a tire inner liner according to claim 1, wherein the polyamide-based segment of the copolymer includes a repeat unit of the following Chemical Formula 1 or Chemical Formula 2:

[Chemical Formula 1]

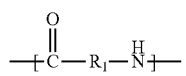

wherein, in the Chemical Formula 1, $R_1$ is a C1-20 linear or branched alkylene group or a C7-20 linear or branched arylalkylene group,

[Chemical Formula 2]

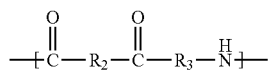

wherein, in the Chemical Formula 2, $R_2$ is a C1-20 linear or branched alkylene group, and $R_3$ is a C1-20 linear or branched alkylene group or a C7-20 linear or branched arylalkylene group.

6. The film for a tire inner liner according to claim 1, wherein the polyether-based segment includes a repeat unit of the following Chemical Formula 3:

[Chemical Formula 3]

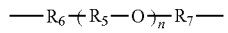

wherein, in the Chemical Formula 3,
$R_5$ is a C1-10 linear or branched alkylene group, n is an integer of from 1 to 100, and
$R_6$ and $R_7$ may be the same or different and are respectively a direct bond, —O—, —NH—, —COO—, or —CONH—.

7. The film for a tire inner liner according to claim 1, wherein the copolymer comprises the polyamide-based segments and the polyether-based segments at a weight ratio of 6:4 to 3:7.

8. The film for a tire inner liner according to claim 1, wherein the base film layer comprises the polyamide-based resin and the copolymer at a weight ratio of 6:4 to 3:7.

9. The film for a tire inner liner according to claim 1, wherein the base film layer has a thickness of 30 μm to 300 μm, and
the adhesive layer has a thickness of 0.1 μm to 20 μm.

10. The film for a tire inner liner according to claim 1, wherein the base film layer is an unstretched film.

11. The film for a tire inner liner according to claim 1, wherein the resorcinol-formalin-latex (RFL)-based adhesive comprises 2 wt % to 30 wt % of a condensate of resorcinol and formaldehyde, and 68 wt % to 98 wt % of a latex.

12. A method for manufacturing a film for a tire inner liner, comprising
melting and extruding a mixture of polyamide-based resin and a copolymer of polyamide-based segments and polyether-based segments at 230° C. to 300° C. to form a base film layer, and
forming an adhesive layer comprising a resorcinol-formalin-latex (RFL)-based adhesive on at least one side of the base film layer,
wherein the content of the polyether-based segments of the copolymer is 15wt % to 50 wt % based on total weight of the base film layer, and
the base film layer has at least 3 glass transition temperature peaks,
wherein the copolymer of polyamide-based segments and polyether-based segments has a weight average molecular weight of 50,000 to 300,000.

13. The method for manufacturing a film for a tire inner liner according to claim 12, wherein the base film layer has at least one glass transition temperature peak at a temperature equal to or less than −10° C.

14. The method for manufacturing a film for a tire inner liner according to claim 12, wherein the base film layer has two glass transition temperature peaks at a temperature equal to or greater than 10° C., and has another glass transition temperature peak at a temperature of −60° C. to −20° C.

15. The method for manufacturing a film for a tire inner liner according to claim 12, further comprising a step of mixing the polyamide-based resin and the copolymer at a weight ratio of 6:4 to 3:7.

16. The method for manufacturing a film for a tire inner liner according to claim 12, wherein the copolymer comprises the polyamide-based segments and the polyether-based segments at a weight ratio of 6:4 to 3:7.

17. The method for manufacturing a film for a tire inner liner according to claim 12, wherein the step of forming the base film layer comprises extruding the mixture to a film of a thickness of 30 μm to 300 μm.

18. The method for manufacturing a film for a tire inner liner according to claim 12, further comprising a step of solidifying the base film layer formed by melting and extruding in a cooling part that is maintained at 5° C. to 40° C.

19. The method for manufacturing a film for a tire inner liner according to claim 12, wherein the step of forming the adhesive layer comprises coating an adhesive comprising 2 wt % to 30 wt % of a condensate of resorcinol and formaldehyde and 68wt % to 97 wt % of a latex on at least one side of the base film layer to a thickness of 0.1 μm to 20 μm.

* * * * *